No. 747,561. PATENTED DEC. 22, 1903.
G. H. MILWARD.
COUPLING FOR TEXTILE ROLLER SECTIONS.
APPLICATION FILED DEC. 21, 1897. RENEWED MAY 29, 1903.
NO MODEL.
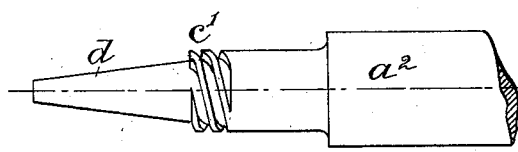
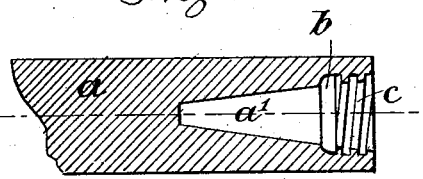
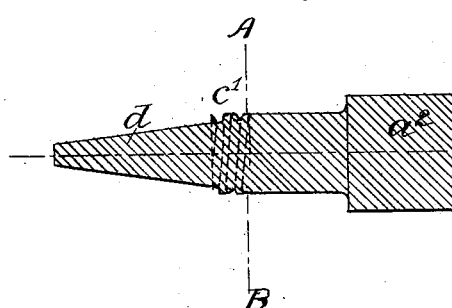
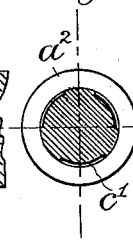
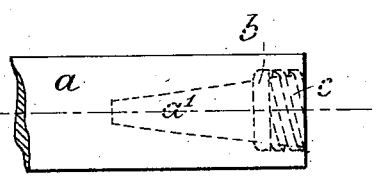
Witnesses:
Inventor:
George Henry Milward
his Attorneys No. 747,561. Patented December 22, 1903.

UNITED STATES PATENT OFFICE.

GEORGE H. MILWARD, OF NOTTINGHAM, ENGLAND.

COUPLING FOR TEXTILE-ROLLER SECTIONS.

SPECIFICATION forming part of Letters Patent No. 747,561, dated December 22, 1903.

Application filed December 21, 1897. Renewed May 29, 1903. Serial No. 159,369. (No model.)

*To all whom it may concern:*

Be it known that I, GEORGE H. MILWARD, a subject of the Queen of Great Britain, residing at Nottingham, England, have invented new and useful Improvements in Couplings for Textile-Roller-Shaft Sections, of which the following is a specification.

This invention relates to an improved means of coupling the fluted rollers generally used in textile machinery and by what is known as "he" or "she" or socket and spigot ends. The square hole and square end in general use necessitates the marking, fitting, and turning of each roller to its fellow, and apart from the increased cost so entailed in manufacture there is considerable loss in repairs and replacing, as the rollers on both sides must be removed to have the one fitted in and the frame or mule kept standing while that is being done.

The purpose of this invention is, in the first place, to make such rollers interchangeable, and, secondly, to form the coupling truly central, thus allowing the use of an improved system of manufacture admitting of the further operations of turning, spacing, fluting, gaging, &c., being performed more accurately and with machine-tools more automatic in character, as well as the present costly hand labor being dispensed with.

My invention will be readily understood from the following description on reference to the accompanying drawings.

Figure 1 is a side elevation, and Fig. 1$^a$ a section, of the spigot end of roller made according to my invention. Fig. 2 shows the socket end in section, and Fig. 2$^a$ shows the same in elevation; and Fig. 3 is a transverse section of the spigot end taken on the line A B, Fig. 1$^a$.

In the coupling shown in the figures a male section $d$ is provided at one end $a^2$ of the shaft or roller, which is conical in shape and with the side of the cone inclined at an angle of 6.5 degrees to the axis of the cone. At the base of the cone is located a three-threaded screw $c'$, with the angle of the thread at approximately right angles to the side of the cone. The female section $a$ has a conical socket $a'$ of a shape similar to the cone of the male section and has grooves corresponding to the threads on the male section.

The work for this coupling may be done by any suitable machine-tools.

The spirals or threads would need to be reversed in accordance with the end from which the roller-shaft was driven, whether right hand or left.

I claim as my invention—

A coupling for textile-roller-shaft sections comprising a male section having a conical portion with a taper at an angle of approximately 6.5 degrees to its axis, and a three-threaded screw at the base of the cone with the angle of the thread approximately at right angles to the side of the cone, and a female member having a corresponding conical socket and threaded portion, substantially as described.

In witness whereof I have hereunto set my hand in presence of two witnesses.

GEORGE H. MILWARD.

Witnesses:
 GEORGE DAVIES,
 CHARLES A. DAVIES.